Patented Aug. 21, 1951

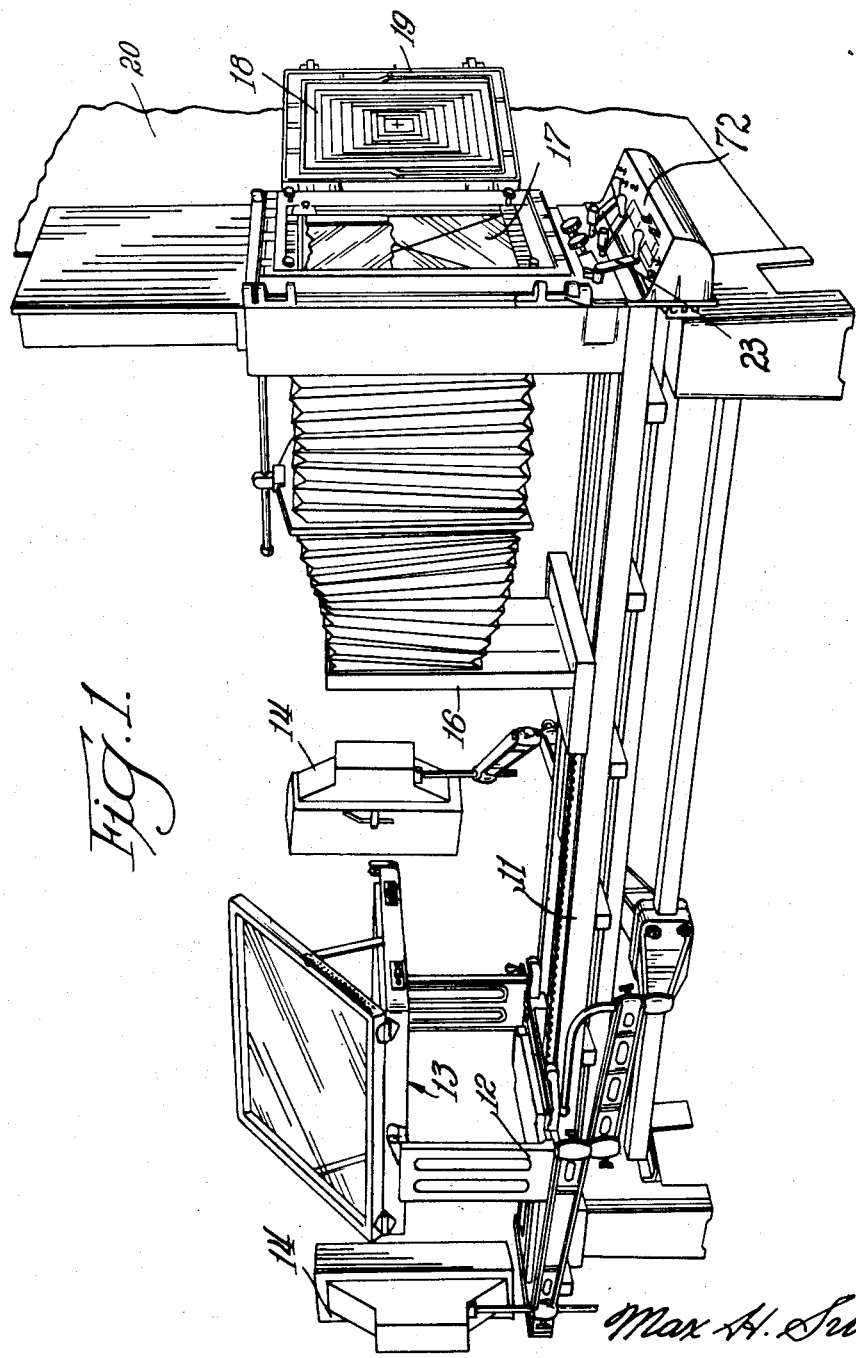

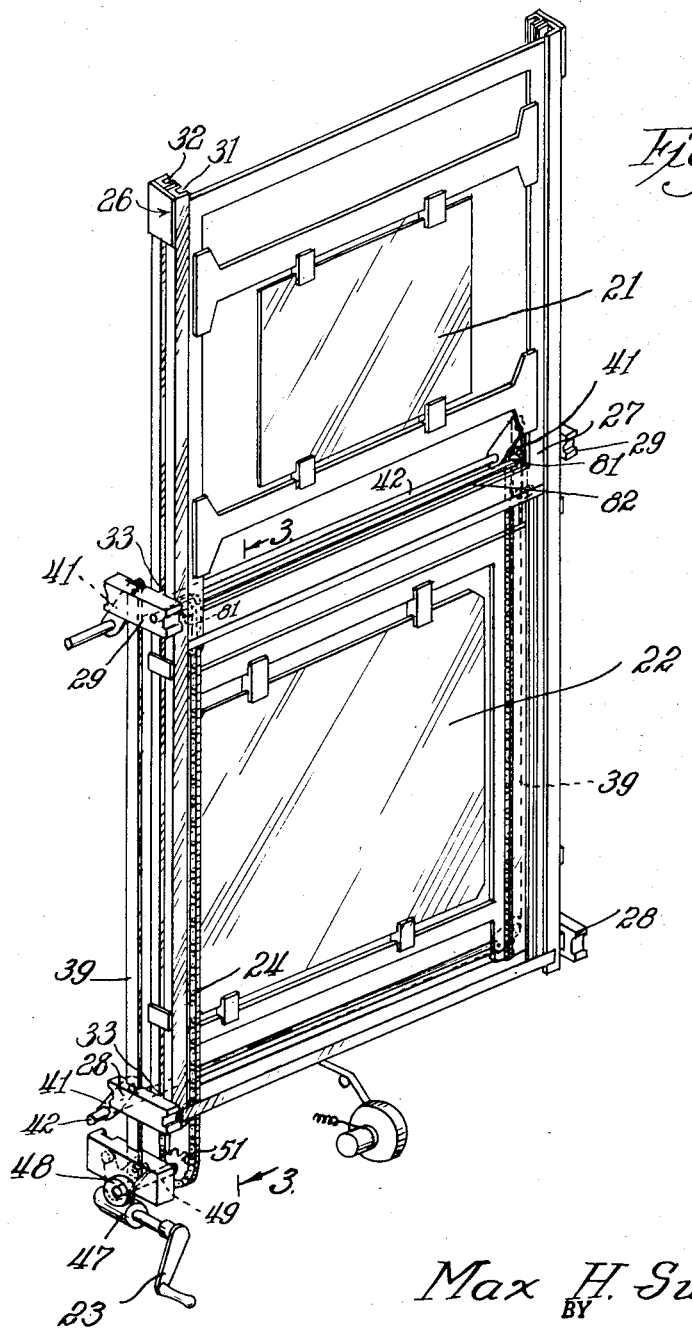

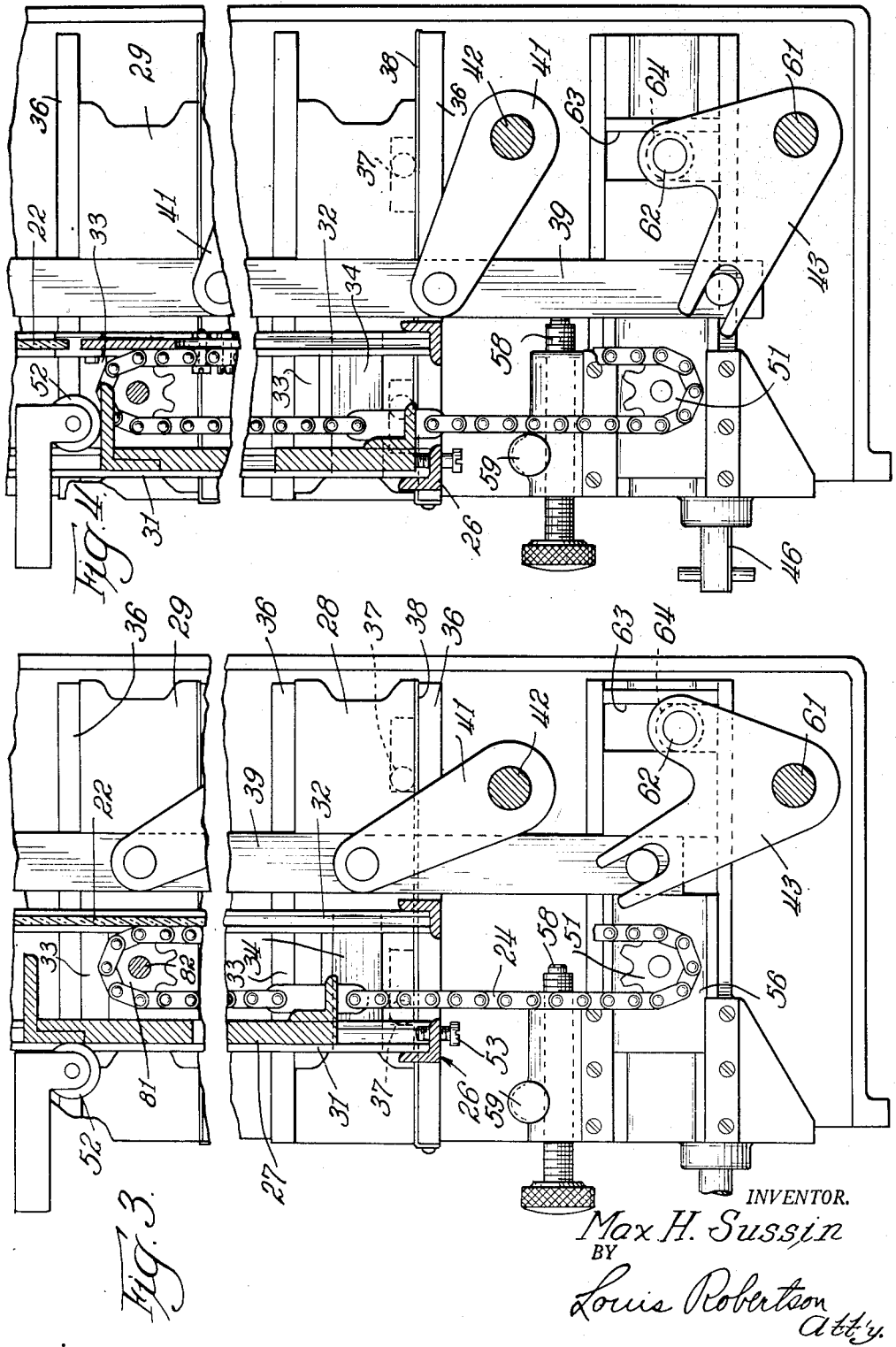

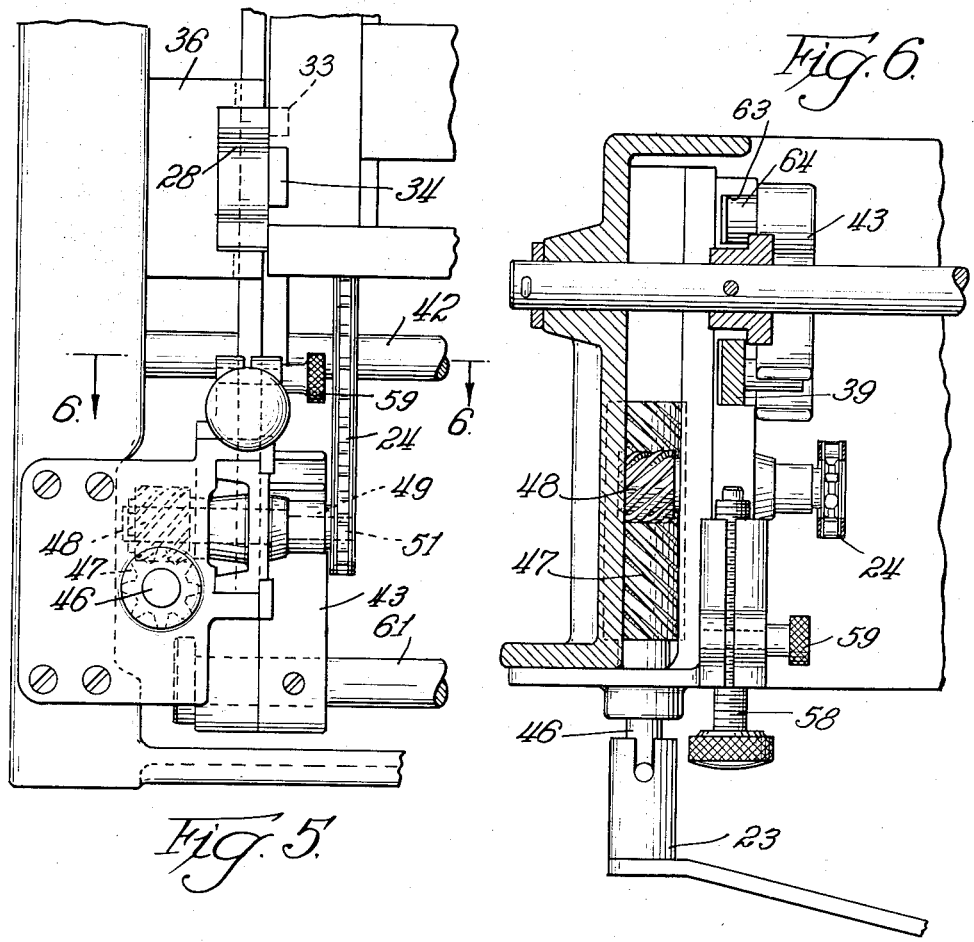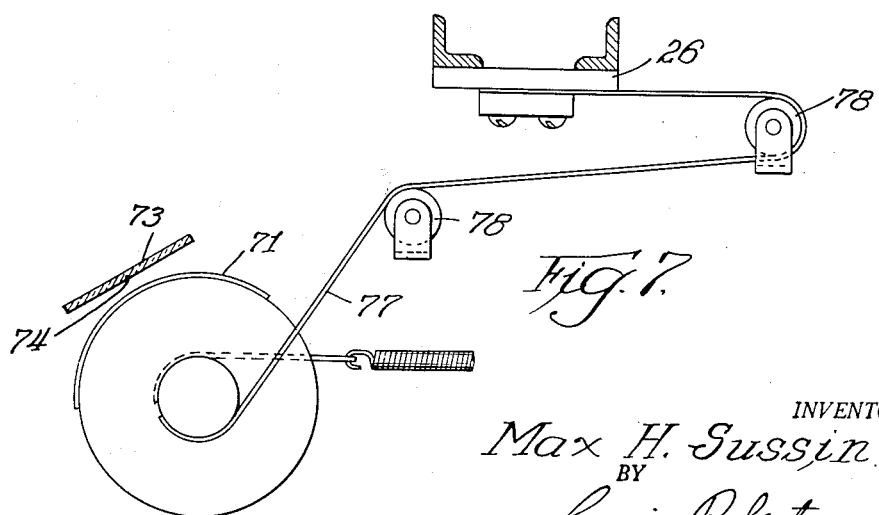

2,564,934

UNITED STATES PATENT OFFICE 2,564,934

PHOTOENGRAVING SCREEN HOLDER

Max H. Sussin, Chicago, Ill., assignor to
Benjamin Sugarman, Chicago, Ill.

Application September 30, 1946, Serial No. 700,291

11 Claims. (Cl. 95—81)

In photo-engraving cameras, it is sometimes necessary to use a screen in front of the film, but at other times the screen should be omitted. A screen is necessary during the exposure of all film to be used for making half tones. In other types of reproduction, the screen should not be used. It may also sometimes be desired, when a ground glass is being used by viewing the image prior to exposing it to the film to omit the screen even though it will be used when the film is exposed. According to common practice, a compensating glass plate is inserted whenever the screen is removed, the plate having the same optical properties as the screen except for omitting the crossed lines which give the screen its peculiar characteristics of a screen. If the compensating plate is not provided, a camera which is perfectly focused when a screen is in position will be imperfectly focused when the screen is removed.

According to the present invention, the screen and compensating plate are automatically interchanged by simply turning a crank. A chain carries one up out of the way while the other is lowered into place. Furthermore, when the screen has been lowered to be in front of the film, additional turning of the same crank will adjust the position of the screen with respect to the film, different screens requiring different adjustments. The screen is always parallel to the focal plane in spite of its movement toward and from the film.

Additional objects and advantages of the invention will be apparent from the description and drawings, in which:

Figure 1 is a perspective view of a photo-engraving camera embodying the present invention.

Figure 2 is a somewhat diagrammatic perspective view of the apparatus for interchanging the screen and compensating plate, to which the present invention is particularly directed.

Figures 3 and 4 are vertical sectional views taken through the structure shown in Figure 2, approximately on the line 3—3; Figure 3 showing the screen in a vertical movement slightly above its bottom limit, and Figure 4 showing the screen in its lower-most position, and also traversed in a horizontal direction to be spaced properly from the film.

Figure 5 is a fragmentary elevational view showing the outside of the operating mechanism.

Figure 6 is a fragmentary horizontal sectional view taken approximately on the line 6—6 of Figure 5.

Figure 7 is a diagrammatic view illustrating the control of the gauge associated with the screen carriage.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

General description of camera

The invention has been illustrated in conjunction with a photographic engraving camera of the dark room type. A camera bed 11 is provided with a copy holder carriage 12 on which a copy holder 13 is mounted. The films are illuminated by lamps 14, and are filmed through a lens carried on a lens board 16 movable on the bed 11. The lens of lens board 16 focuses an image of the copy either on ground glass 17 or on a film carried by a film holder 18, but which during exposure of the pictures is swung to the position of the ground glass 17 in Figure 1. The film holder 18 and the ground glass 17 are preferably located within a dark room built to receive the film end of the camera, an opaque flexible curtain 20 bridging between the film end of the camera and the walls of the dark room to shut off all light from the outside.

In making half tones it is necessary that an optical screen 21 be imposed between the lens and the film. Conventionally, this screen comprises a glass plate having fine ruled lines thereon, and extending at right angles to one another. Preferably they are engraved, but they may be formed otherwise. The screen is positioned slightly in front of the ground glass 17 in Fig. 1. The screen 21 is shown better in Fig. 2, this figure showing the structure which is inside of the camera in Fig. 1. The present invention relates primarily to this structure.

General operation

When the screen 21 is in the position shown in Fig. 1, a compensating plate 22 is in the upper position lying, namely, within the upper housing seen in Fig. 1. Whenever the screen is not being used, it is desirable that it be replaced by the compensating plate 22. This compensating plate 22 is a plate of glass similar to plate 21, except that it does not bear the cross lines. In other respects it has the same optical properties as screen 21, so that it compensates for the screen in the optical system of the camera. Thus, the photographs will be the same with the compensating plate or with the screen.

According to the present invention, the compensating plate 22 and screen 21 may be interchanged merely by turning hand crank 23. If the compensating plate is in the lower position, turning this crank in one direction will drive chains 24 to raise the compensating plate and lower the screen. Continued movement of the crank 23 in the same direction will then traverse the screen 21 toward the film to adjust its spacing therefrom. Different screens require different spacings from the film.

Screen carriage

Although the screen 21 is raised and lowered by chains 24, its position in other respects is determined by a plate carriage 26. This carriage is a frame-like structure, including screen slide-ways or tracks 31, which snugly and resiliently engages the screen holding frame 27 along both vertical edges thereof so that there is no forward and rearward play between the screen frame or holder 27 and the carriage 26. The screen 21 is, of course, firmly positioned with respect to the screen frame 27, so that there is likewise no play between it and the screen carriage 26. Under influence of chains 24 the screen frame 27 may, nevertheless, be raised and lowered in carriage 26.

Parallel traverse mechanism

The screen carriage 26 is carried by two slides 28 and two slides 29, there being one of each at each side of the camera. The weight of the screen carriage 26 may be borne entirely by the slides 28, the slides 29 being used merely for positioning the screen carriage in a direction longitudinal of the camera. The screen carriage 26 includes a forward screen slideway 31 and a plate slideway 32. Between these two is snugly fitted a lug 33 formed on each of the slides 28 and 29. This determines the plane of the plates with respect to the slides 28 and 29. The lower slides 28 are provided with keys 34 fitting into corresponding slots in the carriage 26 to position the carriage vertically.

The slides 28 and 29 move in slideways 36. To decrease friction the slides 28 and 29 are provided with roller bearings 37, the rollers preferably rolling on hardened inserts 38.

Pantograph mechanism

It is essential that the screen be maintained always in a plane parallel to the focal plane, even though it is moved toward and from the film. This is accomplished by means of a pantograph mechanism. This mechanism includes a vertical bar 39 on each side of the apparatus, each vertical bar being pivoted to two crank arms 41. The crank arms operate in pairs, one on each side of the camera, the two cranks of each pair being rigidly connected together by a shaft 42. Inasmuch as the crank arms are maintained at the same angularity by their pivotal connection with the bars 39, it is apparent that the two bars 39 always move together, and maintain parallelism with a predetermined plane. The positioning of the bars 39 is controlled by bell crank lever 43, which operates between the positions shown in Figures 3 and 4. This moves the plate carriage 26 toward and from the film, which would be at the left side of the apparatus, as viewed in Figures 3 and 4.

Common control mechanism

The elevating chains 24 and the pantograph mechanism are both controlled by a single or common control mechanism, which is operated by the crank 23. The crank 23 is removably mounted on a shaft 46, which carries a 45 degree helical cylindrical gear 47. This gear 47 meshes with a helical or worm wheel 48, which is carried on the shaft 49, which also carries the sprocket 51; this sprocket comprising one of the lower sprockets for the chain 24. It is apparent that if the shaft 49 remains in one axial position, rotation of crank 43 will turn gear 47 and rotate worm wheel 48 and sprocket 51 to drive the chains 24 and interchange the screen and compensating plate.

As the screen frame 31 is lowered, any traversing movement thereof toward the film is prevented by a restraining roller 52, which is carried by the main camera frame. The downward movement of the screen frame 27 is limited by a set screw 53 in the bottom of carriage 26. At the time that the screen frame 27 strikes the set screw 23, the upper end of the screen frame is low enough to pass under the restraining roller 52. Thus, the downward movement of screen frame 27 is blocked, but by that time the traversing movement of carriage 26 has ceased to be blocked. Accordingly, further turning of crank 53 and corresponding rotation of 45 degree gear 47 will, because worm wheel 48 can no longer rotate, shift worm wheel 48 in a direction axial of the gear 47. This will move a slide 56 by which the worm wheel 48 and its shaft 49 are carried. The slide 56 is coupled to the bell crank lever 43, so that shifting of the slide 56 swings the bell crank lever from the position shown in Fig. 3 to the position shown in Fig. 4. This, in turn, lowers pantograph bar 39, which swings crank arms 41 and turns shaft 42 to swing the corresponding crank arms on the far side of the camera, and shift the pantograph bar 39 on the far side of the camera exactly as the pantograph bar 39 coupled to bell crank lever 43 is shifted. Pantograph bars 39 snugly fit grooves in slides 28 and 29, so that these slides are correspondingly shifted uniformly, and the carriage 26 is shifted to the position shown in Fig. 4 while being maintained in the same parallelism with respect to the focal plane.

This traversing movement of the screen is limited by a stop screw 58, which is adjusted for the particular screen being used, and is locked in its adjusted position by lock screw 59.

For ease in operation and long life, the bell crank 43 preferably operates on a shaft 61 having bearings on opposite sides of the bell crank 43. Accordingly, the shaft 61 may conveniently extend toward the right, as seen in Fig. 5, to a convenient part of the main frame. For the same reason the coupling between slides 56 and bell crank 43 preferably comprises a pin 62 rigid with bell crank lever 43, and extending into a machined slot 63 in slide 56. The pin 62 is preferably provided with a needle bearing unit 64, which rolls on the walls of slot 63.

Gauge

The operator must know the distance of the screen from the film, whether he is setting the stop screw 58 or is adjusting the position of the screen without use of the stop screw. To this end the gauge 71 is provided, which is visible through the instrument panel 72 seen in Fig. 1. The instrument panel 71 has a window 73 bearing an indicator line 74 positioned adjacent to the gauge 71. The gauge is biased in one direction, and is drawn in the opposite direction by a tape 77, which passes around pulleys 78 and is attached to the carriage 26. The tape 77 extends horizontally from the carriage 26 so that its movement will accurately measure the movement of carriage 26.

In adjusting stop screw 58 the carriage 26 will be moved toward the film until the pantograph bars 59 strike the stop screw 58. The screw 58 will then be turned to move the pantograph bar 39, and the carriage 26 therewith to the correct adjustment, as indicated by the gauge 71. In this movement the worm wheel 48 must drive the helical gear 47. For this reason a reversible pitch, such as 45 degrees, is preferred. The weight of the pantograph parts tends to keep the carriage 26 pressed against the stop screw 58, so that they will follow the stop screw as it is moved outwardly. This also has the advantage that, when the stop screw 58 is locked, the pantograph mechanism tends to press itself against the screw so that it is held in its desired position by gravity.

The chains 24 are made to work in unison by virtue of the fact that their upper sprockets 81 are rigidly connected together by a shaft 82.

From the foregoing it is seen that a photo-engraving camera is provided in which the screen and compensating plate may be interchanged merely by turning a crank, and in which further turning of the crank after lowering the screen will move the screen toward the film to position the screen the proper distance from the film. The screen is reliably maintained in parallelism with focal plane or film in spite of this movement.

I claim:

1. A photo-engraving camera unit including a screen holder adapted to be positioned in front of a film holder and to hold a screen through which a film will be exposed, a compensating plate holder also adapted to be so positioned, a pair of vertically extending looped chains in generally parallel arrangement to each other and to said holders and to each of which both of said holders are connected, one holder to one run of each loop and the other holder to the other run of each loop so that when one holder is moved one way the other is moved the other way, and means for driving said chains in unison for moving the screen holder from the active position to an inactive position while at the same time moving the plate holder from an inactive position to an active position.

2. A photo-engraving camera unit including a screen holder adapted to be positioned in front of a film holder and to hold a screen through which a film will be exposed, a compensating plate holder also adapted to be so positioned, a pair of looped chains in generally parallel arrangement to each other and to said holders and to each of which both of said holders are connected so that when one holder is moved one way the other is moved the other way, and means for driving said chains in unison for moving the screen holder from the active position to an inactive position while at the same time moving the plate holder from an inactive position to an active position, said means including a steeply pitched worm means for turning the worm, and means carried by the screen holder and engaging the worm for moving the chains and, when movement of the chains around their sprockets is prevented, for moving the screen holder in a direction perpendicular to its movement by the chains.

3. A photo-engraving camera unit including a screen holder, a compensating-plate holder, a worm wheel, interchange means operated by rotation of the worm wheel for shifting the two holders in opposite directions for interchanging their positions, traverse means operated by a translatory movement of the worm wheel for traversing one of the holders in a direction generally perpendicular to said directions, a helical gear meshing with the worm wheel and effective upon rotation to rotate the worm wheel at times and at times to give it translatory movement, and means effective to limit one type of movement so as to compel the other movement as a result of the rotation of said helical gear.

4. A photo-engraving camera unit including a screen holder, a compensating-plate holder, a worm wheel, interchange means operated by rotation of the worm wheel for shifting the two holders in opposite directions for interchanging their positions, traverse means operated by a translatory movement of the worm wheel for traversing one of the holders in a direction generally perpendicular to said directions, a helical gear meshing with the worm wheel and effective upon rotation to rotate the worm wheel at times and at times to give it translatory movement, and means effective to limit one type of movement so as to compel the other movement as a result of the rotation of said helical gear; the pitch of said worm wheel and said helical gear being approximately 45 degrees.

5. A photo-engraving camera unit including a screen holder, a compensating-plate holder, a worm wheel, interchange means operated by rotation of the worm wheel for shifting the two holders in opposite directions for interchanging their positions, traverse means operated by a translatory movement of the worm wheel for traversing one of the holders in a direction generally perpendicular to said directions, a helical gear meshing with the worm wheel and effective upon rotation to rotate the worm wheel at times and at times to give it translatory movement, and means effective to limit one type of movement so as to compel the other movement as a result of the rotation of said helical gear, said interchange means including a pair of looped chains on opposite sides of said holders, and a sprocketed shaft keeping the chains synchronized with each other.

6. A photo-engraving camera unit including a screen holder, a compensating-plate holder, a worm wheel, interchange means operated by rotation of the worm wheel for shifting the two holders in opposite directions for interchanging their positions, traverse means operated by a translatory movement of the worm wheel for traversing one of the holders in a direction generally perpendicular to said directions, a helical gear meshing with the worm wheel and effective upon rotation to rotate the worm wheel at times and at times to give it translatory movement, and means effective to limit one type of movement so as to compel the other movement as a result of the rotation of said helical gear, said traverse means including a pair of planographic means on opposite sides of the traversed holder, and shaft means keeping the planographic means in phase with one another.

7. A photo-engraving camera unit including a screen holder, a compensating-plate holder, a worm wheel, interchange means operated by rotation of the worm wheel for shifting the two holders in opposite directions for interchanging their positions, traverse means operated by a translatory movement of the worm wheel for traversing one of the holders in a direction generally perpendicular to said directions, a helical gear meshing with the worm wheel and effective upon rotation to rotate the worm wheel at times and at times to give it translatory movement, and means effective to limit one type of movement so as to compel the other movement as a result of the rotation of said helical gear, said interchange means including a pair of looped chains on opposite sides of said holders, and a sprocketed shaft keeping the chains synchronized with each other, and said traverse means including a pair of planographic means on opposite sides of the traversed holder, and shaft means keeping the planographic means in phase with one another.

8. A photo-engraving camera unit including in combination means for holding a light-sensitive element at the focal plane and across the camera axis, a carriage in front of the focal plane and including front and rear opposed tracks generally parallel to the focal plane, a holder movable in each of said tracks adapted to receive a screen or plate, a pair of chains each looped around one of a pair of sprockets keyed to a common shaft carriage by the carriage, each chain having one run secured to the front holder and one to the rear holder to move one holder along said tracks to a position across the camera axis while moving the other away from the camera axis, support surfaces parallel to said axis movably supporting said carriage, and means for moving said carriage axially along said support surfaces.

9. A photo-engraving camera unit including in combination means for holding a light-sensitive element at the focal plane and across the camera axis, a carriage in front of the focal plane and including front and rear opposed tracks generally parallel to the focal plane, a holder movable in each of said tracks adapted to receive a screen or plate, a pair of chains each looped around one of a pair of sprockets keyed to a common shaft carried by the carriage, each chain having one run secured to the front holder and one to the rear holder to move one holder along said tracks to a position across the camera axis while moving the other away from the camera axis, support surfaces parallel to said axis movably supporting said carriage, a worm wheel carried by the carriage and connected in driving relation to said chains to shift said holders, and a helical gear parallel with said axis and independently supported in mesh with said worm wheel to produce two movements by rotation of the helical gear, one a rotary movement of the worm wheel to drive the chains, and the other a translatory movement of the worm wheel to move said carriage in an axial direction, and stop means to preclude first one of said movements and, after a predetermined stage of operation is reached, then preclude the other movement, so that continued movement of the helical gear in one direction will cause the two movements in succession.

10. A photo-engraving camera unit including in combination means for holding a light-sensitive element at the focal plane and across the camera axis, a carriage in front of the focal plane and including opposed tracks generally parallel to the focal plane, a screen holder movable in said tracks, a chain for moving said screen holder along said tracks from a position across the camera axis to a position away from the camera axis, support surfaces parallel to said axis movably supporting said carriage, a worm wheel carried by the carriage and connected in driving relation to the chain to shift said holder, and a helical gear parallel with said axis and independently supported in mesh with said worm wheel to produce two movements by rotation of the helical gear, one a rotary movement of the worm wheel to drive the chains and the other a translatory movement of the worm wheel to move said carriage in an axial direction, and stop means to preclude first one of said movements and, after a predetermined stage of operation is reached, then preclude the other movement, so that continued movement of the helical gear in one direction will cause the two movements in succession.

11. A photo-engraving camera unit including in combination means for holding a light-sensitive element at the focal plane and across the camera axis, a carriage in front of the focal plane and including a screen holder adapted to be positioned in front of a film holder and to hold a screen through which a film will be exposed, a compensating plate holder also adapted to be so positioned, a pair of vertically extending chains in generally parallel arrangement to each other and to said holders carried by the carriage and to each of which both of said holders are connected, one holder to one run of each loop and the other holder to the other run of each loop so that when one holder is moved one way the other is moved the other way, and means for driving said chains in unison for moving the screen holder from the active position to an inactive position while at the same time moving the plate holder from an inactive position to an active position, support surfaces parallel to said axis movably supporting said carriage, and means for moving said carriage axially along said support surfaces and said chain with it in undisturbed relationship.

MAX H. SUSSIN.

REFERENCES CITED

The following references are of record in the file of this patent:

UNITED STATES PATENTS

| Number | Name | Date |
|---|---|---|
| 1,209,239 | Wende | Dec. 19, 1916 |
| 2,044,184 | Powers | June 16, 1936 |
| 2,115,233 | Powers | Apr. 26, 1938 |